Patented June 27, 1939

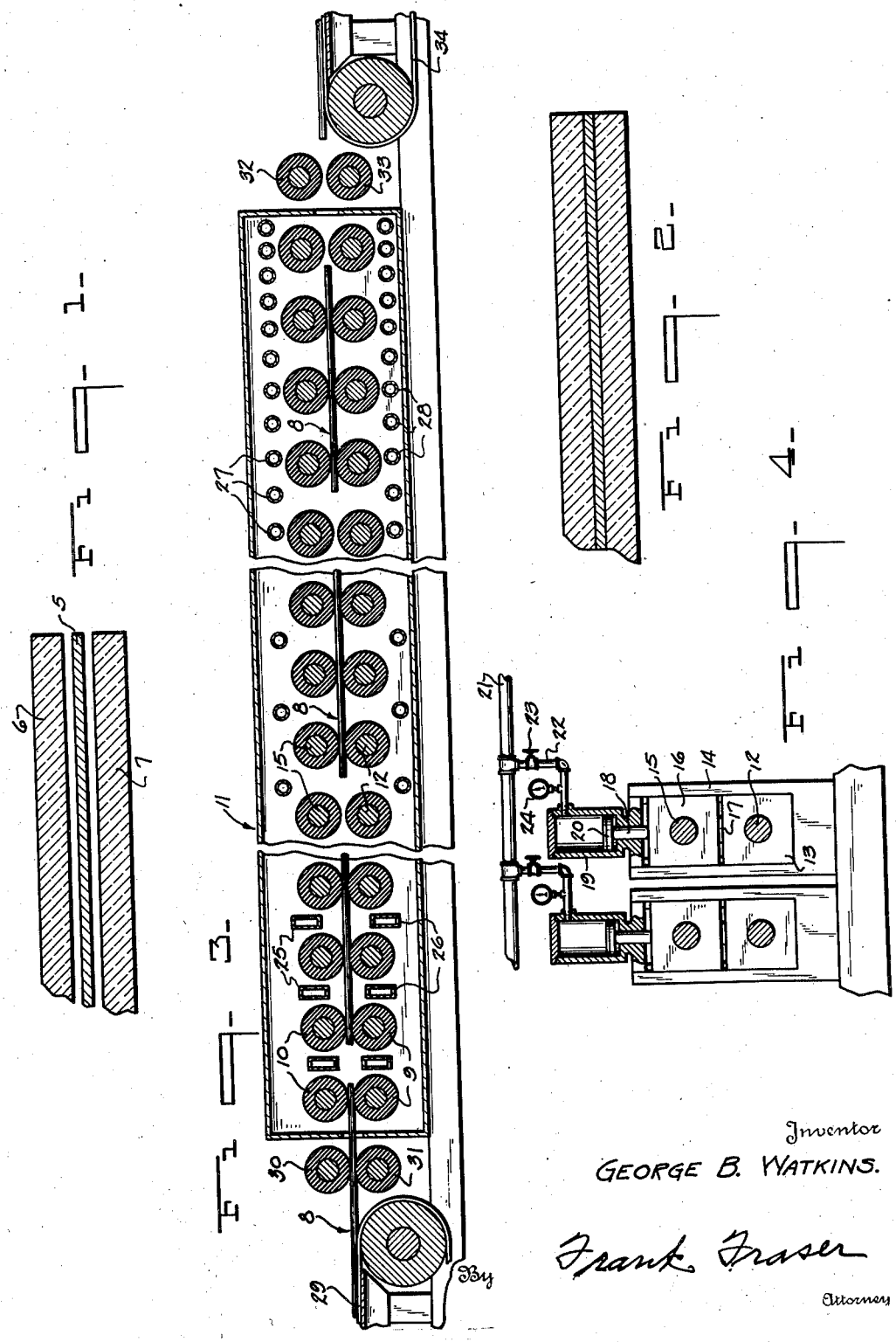

2,164,301

UNITED STATES PATENT OFFICE 2,164,301

LAMINATED SAFETY GLASS

George B. Watkins, Toledo, Ohio, assignor to Libbey-Owens-Ford Glass Company, Toledo, Ohio, a corporation of Ohio Application May 9, 1936, Serial No. 78,739

6 Claims. (Cl. 49—81)

This invention relates to the manufacture of laminated safety glass.

In carrying out the invention, a sheet of synthetic resin plastic is interposed between two sheets of glass to form a "sandwich" which is then subjected to a pressing operation at suitable temperatures to effect the bonding of the laminations to form a composite structure. The resin plastic used may consist of properly plasticized Butylvar, Formvar, Alvar, the acrylic acid ester type of resin, vinyl acetate, etc. It has been found that a resin plastic, when bonded between glass sheets, offers greater resistance to impact at high, medium, and low temperatures normally encountered in actual use than does similar laminated glass having a cellulosic derivative plastic bonded between the glass sheets. It is characteristic of the cellulosic derivative plastics to become relatively more brittle at the lower temperatures and it has been an aim in the art for some time to avoid this tendency toward brittleness.

The object of the present invention is the provision of an improved process and apparatus for effecting the bonding together of the laminations in a rapid, efficient, and economical manner. More particularly, the invention comprehends the bonding together of the laminations in a continuous manner and during the pressing operation varying the amount of pressure applied to the sandwich as well as the temperature thereof in such a manner as to first exclude air and non-condensable gases from between the laminations, after which permanent adhesion is obtained.

Briefly stated, the glass-plastic sandwich is first subjected to a relatively high maximum pressure while at a relatively low temperature, after which the pressure is gradually reduced while the temperature is being gradually increased so as to effect the desired bonding of the glass and plastic, while at the same time preventing flowing or extruding of the plastic from between the glass sheets.

In the drawing wherein like numerals are employed to designate like parts throughout the same, Fig. 1 is a diagrammatic sectional view showing two sheets of glass and a layer of plastic in proper superimposed relationship, Fig. 2 is a similar view showing the laminated sheet after bonding, Fig. 3 is a longitudinal vertical sectional view of the apparatus employed for bonding the laminations, and Fig. 4 is a side elevation of a portion of the apparatus of Fig. 3, partially in section, and showing the means for controlling the pressure of the pressing rolls upon the laminations.

Referring first to Fig. 1, there is illustrated a sheet 5 of a suitable synthetic resin plastic such as for example Alvar, Formvar, or Butylvar type of resin disposed between the two sheets of glass 6 and 7. The sheet 5 is a preformed layer of plastic including any preferred and selected amount of plasticizer, and it will be understood that adhesives or other bond inducing mediums can be employed to promote the requisite bond between the laminations or not, as desired.

After the glass and plastic laminations have been arranged in properly assembled relationship to form a sandwich, the said sandwich is subjected to the desired temperatures and pressures to unite the said laminations and thus form a unitary structure. The pressing of the sandwiches is adapted to be accomplished in a continuous manner and preferably by means of a roller type of press as shown in Fig. 3 wherein the sandwiches 8 are passed horizontally between a series of pairs of horizontally aligned rolls 9 and 10, preferably of rubber or rubber composition. The pressing rolls 9 and 10 are enclosed in a housing 11.

The lower roll 9 of each pair of rolls is carried upon a shaft 12 projecting at its opposite ends through the side walls of the housing 11 and journaled at each end in a bearing block 13 mounted in the vertical standard 14 while the corresponding upper roll 10 is carried upon a shaft 15 also projecting at its opposite ends beyond the housing 11 and journaled at each end in a bearing block 16 slidably mounted in the standard 14 above bearing clock 13. Arranged between the bearing blocks 13 and 16 is a wedge 17 which limits the movement of the said blocks and consequently the rolls 9 and 10 toward one another.

The upper bearing blocks 16 of each pair of rolls are each provided with a vertical rod 18 which projects upwardly through the bottom of a cylinder 19 supported upon the top of the standard 14 and fixed to the rod 18 within cylinder 19 is a piston 20. Extending longitudinally at each side of the housing 11 is a supply pipe 21 containing either liquid or air under pressure and which is in communication with each of the cylinders 19 at the corresponding side of the housing by means of a pipe 22. Interposed in each pipe 22 is a valve 23 operable to control the amount of compressed air or liquid supplied to the respective cylinder and also associated with the pipe 22 is a gauge 24 for indicating the amount of pressure within the said cylinder.

The supply pipe 21 at each side of the housing is common to all of the cylinders 19 at the corresponding side thereof so that by proper regulation of the valves 23, the desired pressure exerted by the individual pairs of rolls 9 and 10 upon the sandwiches 8 can be independently controlled.

In the bonding of the glass-plastic sandwiches, the said sandwiches are first subjected to a relatively high pressure at a relatively low temperature, after which the pressure is gradually reduced while the temperature is simultaneously increased. It is preferred, therefore, that the first set of rolls 9 and 10 or the first group of rolls exert the desired maximum pressure upon the sandwiches at the beginning of the pressing operation and while the glass and plastic are, generally speaking, at room temperature or lower to exclude air and non-condensable gases from between the laminations. In order to maintain the sandwiches at the desired relatively low temperature, there may be arranged within the housing 11, at the forward end thereof, a plurality of pairs of coolers 25 and 26, said coolers being positioned between adjacent pairs of rolls 9 and 10 above and beneath the path of travel of the sheet respectively. For the purpose of gradually reducing the cooling effect of the coolers upon the sandwiches as they pass between succeeding pairs of rolls, the said coolers may be spaced further and further away from the path of travel of the sandwiches as shown in Fig. 3. The pressing of the sandwiches to extrude air and non-condensable gases while at the same time maintaining the sandwiches at a relatively low temperature may be termed the first step of the continuous pressing operation.

As the sandwiches progress between the rolls, the pressure of the rolls thereon is gradually reduced while the temperature within the housing is increased. The gradual lessening of the roll pressure can be readily accomplished by proper regulation of the valves 23 while the gradual increase in temperature may be effected by means of a plurality of pipes 27 and 28 arranged above and beneath the line of travel of the sandwiches and through which steam or some other suitable heating medium may be circulated. In order to gradually increase the temperature of the sandwiches as they proceed through the housing, the pipes 27 and 28 can be placed closer and closer together as shown in Fig. 3.

In the pressing of the sandwiches, they are first placed upon a conveyor 29 from which they pass between a pair of nipping rolls 30 and 31 and thence into the housing 11 and between the pressing rolls 9 and 10 which are positively driven to advance the sandwiches through the said housing. Since the resin plastics above set forth might be tacky at normal temperatures, the first group of rolls is adjusted to give the desired maximum pressure as explained above, and during this pressing treatment the glass sheets are either at normal room temperature or a lower temperature, with the result that air and non-condensable gases will be swept from between the glass-plastic laminations. Then, as the sandwiches progress between the rolls, the temperature thereof is gradually raised to the point necessary for effecting permanent bonding of the laminations. In view of the fact that as the temperature of the resin plastics is raised, their softness or flowability increases, it is desirable to decrease the pressure with increase in temperature to prevent flowing or extruding of the plastic and therefore pinching of the laminations around the edges thereof. As the sandwiches issue from the housing, they pass between a pair of rolls 32 and 33 onto the receiving conveyor 34.

Due to the nature of the synthetic resin plastics above described, it is not necessary to undercut and seal the marginal portions of the composited glass, which is shown in Fig. 2, because it has been found that weathering does not adversely effect either the plastic or the bond between the plastic and glass.

It will of course be readily understood that the invention is not limited to the specific pressing apparatus disclosed and that any suitable means may be employed for cooling and for heating the glass-plastic sandwiches. If it is desired that the sandwiches be at normal room temperature when the maximum pressure is applied thereto, the coolers 25 and 26 may be omitted. It is only when a temperature lower than normal room temperature is desired that positive cooling means are used.

I claim:

1. In the manufacture of laminated safety glass, the process comprising the steps of interposing a layer of synthetic resin plastic between two sheets of glass to form a sandwich, subjecting the sandwich initially to a relatively high pressure and a relatively low temperature, and in then simultaneously decreasing the pressure upon the said sandwich while increasing the temperature thereof.

2. In the manufacture of laminated safety glass, the process comprising the steps of interposing a layer of synthetic resin plastic between two sheets of glass to form a sandwich, subjecting the sandwich initially to a maximum pressure and minimum temperature, and in then gradually decreasing the pressure upon the said sandwich while increasing the temperature thereof until the minimum pressure and maximum temperature desired are reached.

3. In the manufacture of laminated safety glass, the process comprising the steps of interposing a layer of synthetic resin plastic between two sheets of glass to form a sandwich, subjecting the sandwich first to a relatively high pressure at a relatively low temperature to force any air or non-condensable gases from between the laminations, and in then subjecting the said sandwich to a relatively lower pressure at a relatively higher temperature to effect permanent adhesion of the laminations.

4. In the manufacture of laminated safety glass, the process comprising the steps of interposing a layer of synthetic resin plastic between two sheets of glass to form a sandwich, carrying the sandwich continuously forwardly in a substantially horizontal path, subjecting the sandwich during travel thereof first to a relatively high rolling pressure at a relatively low temperature to force any air or non-condensable gases from between the laminations, and in gradually reducing the rolling pressure upon the said sandwich while simultaneously increasing the temperature thereof to effect permanent adhesion of the laminations.

5. In the manufacture of laminated safety glass, the process comprising the steps of interposing a layer of synthetic resin plastic between two sheets of glass to form a sandwich, passing the sandwich continuously forwardly in a substantially horizontal path through a substantially closed chamber, initially cooling the sandwich within the chamber and simultaneously applying maximum rolling pressure thereto to force any air or non-condensable gases from between the laminations, and in increasing the temperature of the sandwich while decreasing the rolling pressure thereon upon continued movement thereof through said chamber to effect permanent adhesion of the laminations.

6. In the manufacture of laminated safety glass, the process comprising the steps of interposing a layer of synthetic resin plastic between two sheets of glass to form a sandwich, passing the sandwich continuously forwardly in a substantially horizontal path between a plurality of pairs of pressing rolls, applying the maximum pressure upon the sandwich at the beginning of the pressing operation while maintaining it at a relatively low temperature to force any air or noncondensable gases from between the laminations, and in gradually reducing the pressure upon the said sandwich as it passes between the said rolls while gradually increasing the temperature thereof to effect permanent adhesion of the laminations.

GEORGE B. WATKINS.